United States Patent
Boeger

(10) Patent No.: US 7,478,716 B2
(45) Date of Patent: Jan. 20, 2009

(54) SHIFTING DEVICE FOR A SYNCHRONIZED GEAR CHANGE TRANSMISSION

(75) Inventor: Thorsten Boeger, Wiernsheim (DE)

(73) Assignee: Dr. Ing h.c.F. Porsche Aktiengesellschaft, Stuttgart (DE)

(*) Notice: Subject to any disclaimer, the term of this patent is extended or adjusted under 35 U.S.C. 154(b) by 296 days.

(21) Appl. No.: 11/266,222

(22) Filed: Nov. 4, 2005

(65) Prior Publication Data

US 2007/0170032 A1 Jul. 26, 2007

(30) Foreign Application Priority Data

Nov. 4, 2004 (DE) ................. 10 2004 053 213

(51) Int. Cl.
*F16D 23/06* (2006.01)

(52) U.S. Cl. ....................... 192/53.36; 74/339

(58) Field of Classification Search ............ 192/53.361, 192/53.3, 53.34, 53.341, 53.36; 74/339
See application file for complete search history.

(56) References Cited

U.S. PATENT DOCUMENTS

| | | | | |
|---|---|---|---|---|
| 1,935,234 A | * | 11/1933 | White | ................ 74/527 |
| 4,494,638 A | * | 1/1985 | Zenker | ............. 192/48.91 |
| 6,554,114 B2 | * | 4/2003 | Lee | ............... 74/339 |

FOREIGN PATENT DOCUMENTS

| | | |
|---|---|---|
| DE | 44 04 093 | 2/1994 |
| DE | 4404093 C1 * | 5/1995 |
| DE | 101 36 429 C1 | 10/2002 |

OTHER PUBLICATIONS

European Search Report dated Dec. 4, 2006 (Five (5) pages) Including English translation of relevant portion.

* cited by examiner

*Primary Examiner*—Richard M. Lorence
*Assistant Examiner*—Derek D. Knight
(74) *Attorney, Agent, or Firm*—Crowell & Moring LLP

(57) ABSTRACT

A gearshift mechanism for a synchronized gear change transmission of a motor vehicle, having a gearshift sleeve which is displaceably supported on a synchronizer body and which can be brought into operative engagement with a gear wheel via at least one synchronizer ring. To support the synchronization process, first and second recesses are formed in the inner peripheral face of the gearshift sleeve, and locking blocks with a spring-loaded ball are provided on the synchronizer body, which engage in the recesses in certain shift positions.

For preliminary and subsequent synchronization, the first and second recesses formed in the inner peripheral face of the gearshift sleeve be radially and axially offset and each cooperate with a spring-loaded ball.

2 Claims, 2 Drawing Sheets

SHIFTING DEVICE FOR A SYNCHRONIZED GEAR CHANGE TRANSMISSION

BACKGROUND OF THE INVENTION

The present invention relates to a gearshift mechanism for a synchronized gear change transmission having a gear shift sleeve displaceably supported on a synchronizer body, which can be brought into operative engagement with a gear wheel by means of at least one synchronizer ring, such that, to support the synchronization process, first and second recesses are formed in the inner peripheral face of the gearshift sleeve and locking blocks with a spring-loaded ball which engage in the recesses in certain shift positions are provided on the synchronizer body, such that the recesses have lateral slopes by means of which the axial contact forces applied against the synchronizer ring can be produced with different force peaks in cooperation with the ball as the gearshift sleeve is displaced, characterized in that, for a preliminary and subsequent synchronization, the first and second recesses formed in the inner peripheral face of the gearshift sleeve are radially and axially offset relative to one another and each cooperates with a spring-loaded ball.

DE 44 04 093 C2 describes generic gearshift synchronization, proposing two recesses formed in succession in the inner peripheral face of the gearshift sleeve and separated from one another by overpass edges to prevent so-called gear grinding in gear synchronization. When the gearshift sleeve is displaced, these two recesses cooperate with a spring-loaded ball fixed in a locking block in the synchronizer body. With the second recess directly adjacent to the first recess, a second peak of force is produced via the spring-loaded ball, by which a corresponding subsequent synchronization can be achieved.

An object of the invention is to further improve preliminary and subsequent synchronization for a synchronized gearshift mechanism.

This object has been attained by providing that for a preliminary and subsequent synchronization, the first and second recesses formed in the inner peripheral face of the gearshift sleeve are radially and axially offset relative to one another and each cooperates with a spring-loaded ball.

Through radially and axially offset recesses formed in the inner peripheral face of the gearshift sleeve, greater freedom in the geometric configuration of the recesses and/or the spherical bodies cooperating with the recesses can now be advantageously achieved. As a result, the axial overthrust forces with force peaks of different magnitudes necessary for optimal preliminary and subsequent synchronization can be generated.

By a different geometric configuration of the first and the second recesses or the spring-loaded balls cooperating with the recesses, the optimal overthrust forces required for preliminary and subsequent synchronization can also be generated.

In addition to the different geometric configuration of the recesses and/or the balls, different spring characteristics may also be used to influence the overthrust force.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
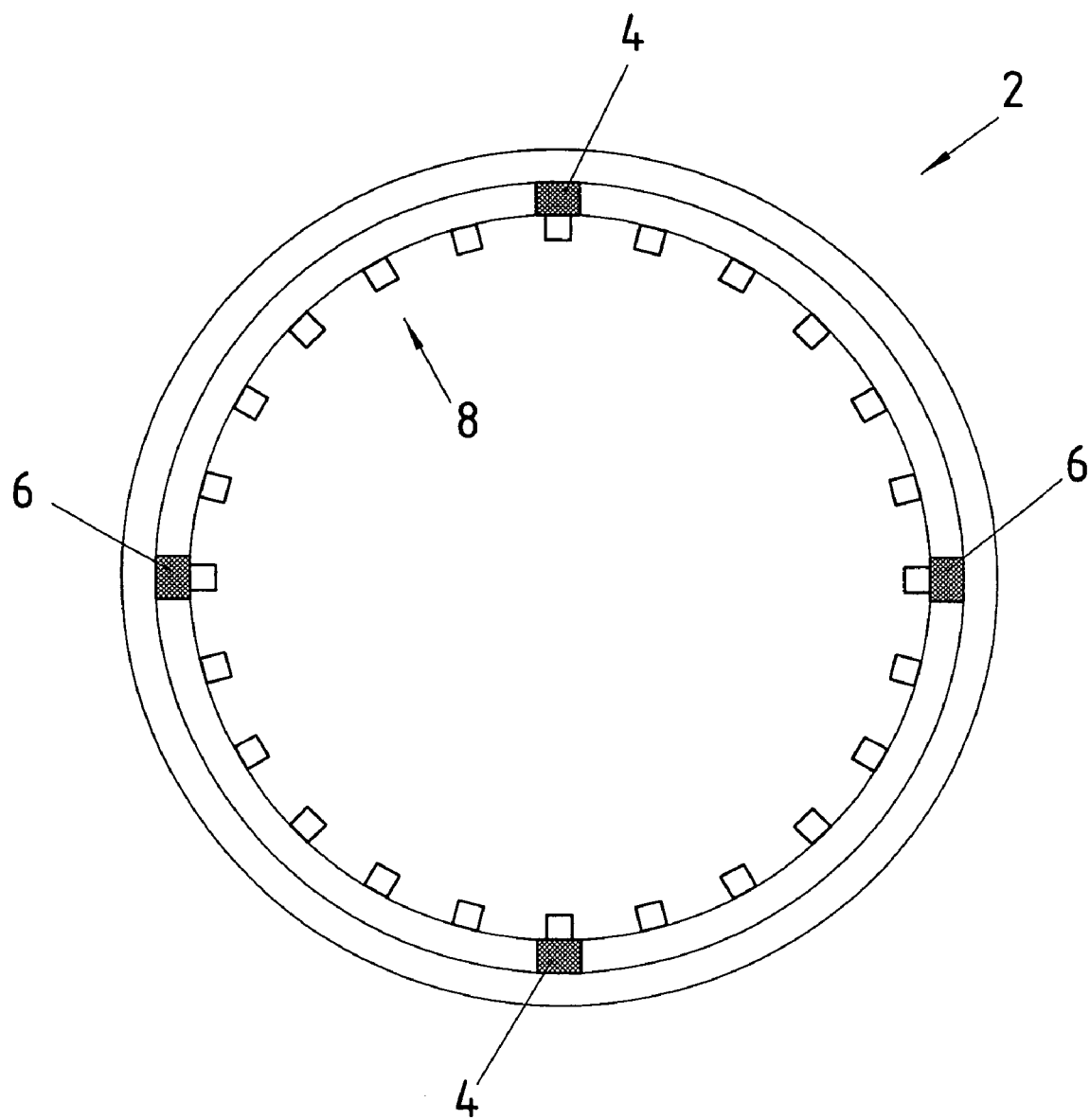
FIG. 1 is a schematic side view of a gearshift sleeve or clutch sleeve of a synchronization device according to the present invention.
Figure 2:
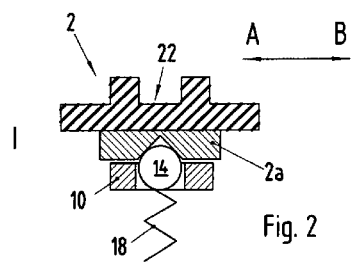
FIGS. 2 to 7 are schematic cross-sectional views showing three possible positions of a gearshift sleeve.
Figure 5:
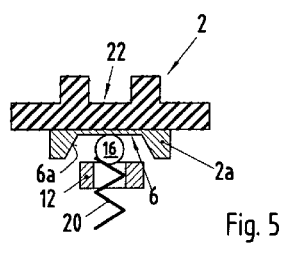

The gearshift sleeve 2 in the illustrated embodiment has two recesses 4, 6 in the inner peripheral face 2a, which are radially and axially offset relative to one another, and are formed on the inside of the gearshift sleeve 2 in addition to the internal teeth designated generally by numeral 8. As generally known and therefore not depicted in detail, the gearshift sleeve 2 is supported axially displaceable on a synchronizer body and is radially fixed via the inner teeth 8 with the outer teeth formed on the synchronizer body.

So-called locking blocks 10, 12 shown in FIGS. 2 to 7, in the openings of which a ball 14, 16 is held, are disposed in the known synchronizer body (not depicted in further detail) which carries the gearshift sleeve 2. The two balls 14, 16 are pressed against the inner peripheral face 2a of the gearshift sleeve 2 by a spring 18, 20. The two recesses 4, 6 formed in the inner peripheral face 2a of the gearshift sleeve 2 and the balls 14 and 16 cooperating with the recesses 4, 6 in certain shift positions are geometrically different. In the illustrates example, the diameter of the first ball 14 is selected to be larger than the diameter of the second ball 16, while the first recess 4 is cuneiform and the second recess 6 trapezoidal. The size and geometric configuration of the recesses 4, 6 and the balls 14, 16 can, of course, be adapted to the specific conditions of a given application. The same applies to the rating of the springs 18, 20, which likewise differs in the illustrated example.

Figure 8:
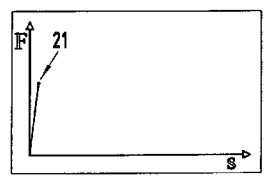
FIGS. 8 to 10 are force/displacement diagrams corresponding to the three shift positions of the gearshift sleeve shown in FIGS. 2 to 7.
Figure 3:
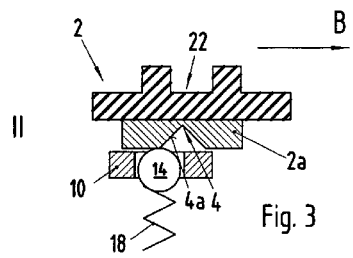
Figure 6:
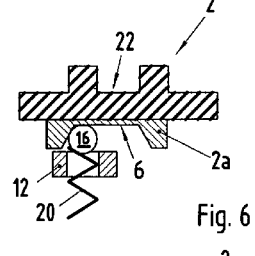
Figure 9:
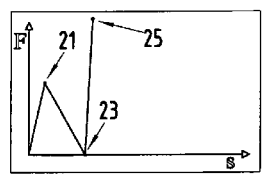
Figure 4:
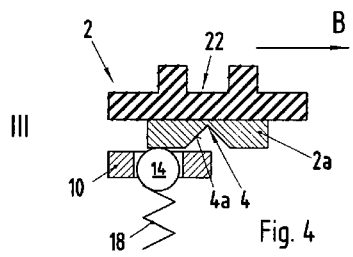
Figure 7:
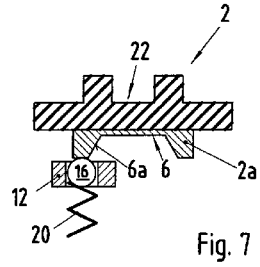
Figure 10:
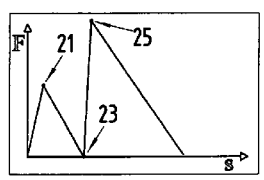

The synchronization process will now be explained in greater detail below. A gearshift fork (not depicted) engages in a known way in an annular groove 22 formed on the outer periphery of the gearshift sleeve 2, allowing displacement of the gear shift sleeve optionally in direction A or B. In the displacement of the gearshift sleeve 2 from a shift position I into a shift position II, where the gearshift sleeve 2 is displaced in direction B, for example, a so-called preliminary synchronization occurs in which the locking block 10 presses the synchronizer ring against the friction surface of the gear wheel via the ball 14. This overthrust force, which is independent of the driver's actual shifting movement, is produced as the ball 14 rolls off the slope 4a of the recess 4. This is graphically illustrated in FIG. 8 by the force peak at point 21. Because of the rotating gear wheel the synchronizer ring is twisted in its position by the overthrust force acting in axial direction, such that its pawls prevent a through-connection of the gearshift sleeve at that time. As the gearshift sleeve 2 is further displaced—see shift position II—in the course of which the actual synchronization (i.e., the equalization of the rotational speed of the gearshift sleeve 2 and the gearwheel occurs), the overthrust force drops to a point 23 as seen in FIG. 9. When the gearshift sleeve 2 is displaced from shift position II toward shift position III, a second force peak (point 25) is produced by the second recess 6 and the ball 16 rolling off the slope 6a of the recess 6. This causes a renewed axial contact force pressing against the synchronizer ring, so that a so-called subsequent synchronization occurs. This subsequent synchronization, which is followed by the actual through-connection of the gearshift sleeve 2, ensures that the previously synchronized components of the synchronization device do not diverge again with regard to their rotational speeds but are coupled via a frictional engagement, so that a through-connection without grinding is made possible. As may be seen from the force/displacement diagrams shown in FIGS. 8 through 10, the amplitude of the second force peak is selected to be larger and can be achieved, for example, by a correspondingly higher spring rating of the spring 20. In the shift position III, positive locking is achieved between the synchronization unit, i.e., the gearshift sleeve 2 and the gear wheel to be shifted. To this end the two balls 14, 16 slide off the inner peripheral face 2*a* of the gearshift sleeve.

The invention claimed is:

1. Gearshift mechanism for a synchronized gear change transmission of a motor vehicle, comprising a gear shift sleeve displaceably supportable on a synchronizer body arranged to be brought into operative engagement with a gear wheel, first and second recesses being formed in an inner peripheral face of the gearshift sleeve and locking blocks each with a member engaging in the first and second recesses in certain shift positions being provided on the synchronizer body, and a spring associated with and spring-loading a respective one of the members, with the spring associated with one of the members having a spring characteristic different from that associated with the other of the members such that the first and second recesses have lateral slopes for applying axial contact forces with different force peaks in cooperation with the respective spring-loaded member as the gearshift sleeve is displaced, wherein for a preliminary and subsequent synchronization, the first and second recesses are arranged offset relative to one another in a circumferential direction in the inner peripheral face of the gearshift sleeve, with the first and second recesses being constructed differently from each other such that they have different widths in an axial direction.

2. Synchronization method for a motor vehicle gear change transmission, comprising:

displacing a gearshift sleeve into a selected shift position;

effecting preliminary synchronization whereby a locking block operatively cooperates with a gear wheel friction surface via a first member loaded by a first spring by which an overthrust force independent of a driver's actual shifting movement is produced as the member moves off a slope of a first recess arranged in the gearshift sleeve and operatively cooperating with the first member; and further displacing the gearshift sleeve for subsequent synchronization so that the overthrust force drops and thereafter producing a peak force as a second member loaded by a second spring having a spring characteristic different from that of the first spring by which the spring member moves off a slope of a second recess operatively cooperating with the second member, with the first and second recesses being circumferentially offset relative to one another and constructed so as to have different widths in an axial direction.

* * * * *